March 27, 1956 A. C. HOWARD 2,739,657

SELECTIVE WHEEL DRIVE CONTROL FOR POWER-DRIVEN MACHINES

Filed Dec. 10, 1954 4 Sheets-Sheet 1

March 27, 1956 A. C. HOWARD 2,739,657

SELECTIVE WHEEL DRIVE CONTROL FOR POWER-DRIVEN MACHINES

Filed Dec. 10, 1954 4 Sheets-Sheet 3

March 27, 1956 A. C. HOWARD 2,739,657

SELECTIVE WHEEL DRIVE CONTROL FOR POWER-DRIVEN MACHINES

Filed Dec. 10, 1954 4 Sheets-Sheet 4

United States Patent Office 2,739,657

Patented Mar. 27, 1956

2,739,657

SELECTIVE WHEEL DRIVE CONTROL FOR POWER-DRIVEN MACHINES

Arthur Clifford Howard, East Horndon, England, assignor to Rotary Hoes Limited, East Horndon, England Application December 10, 1954, Serial No. 474,548

4 Claims. (Cl. 180—6.2)

The invention relates to a walk-type cultivating machine of the kind having a driven cultivating element and a pair of driven, ground-engaging wheels arranged in axially-spaced relationship on a transverse shaft of the machine, the machine having a power-driven shaft from which the wheel shaft and cultivating element can be driven. The object of the invention is to improve the manoeuvrability of such a machine by providing for at least one of the wheels optionally to rotate freely.

Figure 1:
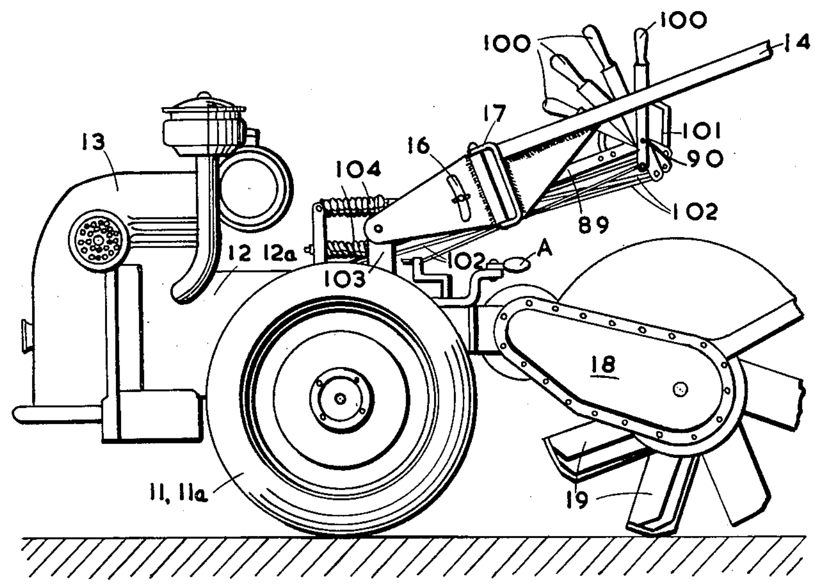
Figure 1 is a side elevation of one form of walk-type cultivating machine in accordance with the invention.

The cultivating machine shown in Figure 1 has a pair of coaxial ground-engaging wheels 11 supporting a casing 12 with which is fast an internal-combustion power unit indicated generally at 13. A pair of handle-bars (one of which is shown at 14) is supported from the casing 12 by respective brackets 15 and they have means, indicated generally at 16 and 17 (but not forming part of the present invention), for enabling them to be adjusted vertically and laterally. Attached to the rear of the casing 12 is a cultivating unit 18 having a driven rotor with earth-working blades 19.

Figure 2:
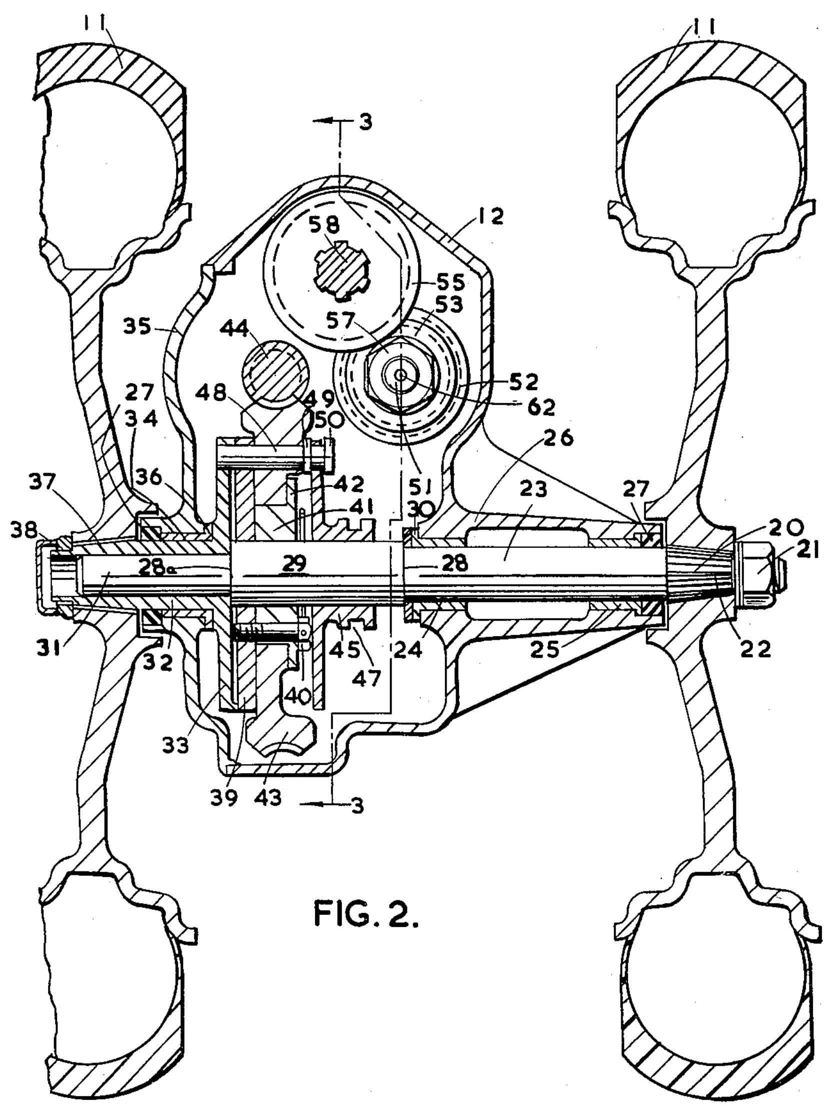
Figure 2 is a section, to an enlarged scale, in the vertical plane containing the axis of the ground-engaging wheels.

Referring to Figure 2 it will be seen that the right-hand wheel 11 is made fast by splines 20 and nut 21 to a coned portion 22 of a shaft 23, the latter supported in bearing sleeves 24, 25 in a tubular, lateral extension 26 of the casing 12. An oil seal 27 is arranged between the sleeve 25 and the hub of the wheel, and the shaft is located against outward movement by a shoulder 28 of a central portion 29 which abuts, through a washer as shown, a radial flange 30 at the adjacent end of the sleeve 24, which flange in turn abuts a radial face of the extension 26.

The opposite end 31 of the shaft 23 is of reduced diameter, and journalled upon it is a sleeve 32 having a radial flange 33 at its inner end abutting a shoulder 28*a* at the junction of the shaft portions 29, 31. The sleeve 32 is journalled in a bearing liner 34 within a boss of a detachable cover 35 of the casing 12, and the liner has a radial flange 36 locating it between the boss and the adjacent side of the radial flange 33.

The left-hand wheel 11 has a blind, splined connection at 37 adjacent the outer end of the sleeve 32, and the latter has a screw-threaded extremity on which is a retaining nut 38 for the wheel.

Adjacent the shoulder 28*a* the shaft portion 29 carries a flange 39 which is of the same diameter, and close to, the flange 33, the flange 39 being secured by a ring of screws 40 to a hub 41 made fast, as by welding, to the shaft portion 29. This hub has a radial flange 42 which, together with the flange 39 and the periphery of the hub 41, provides a bearing channel for a worm-wheel 43 driven, in a manner hereinafter described, by a worm 44.

A selector 45, axially slidable on the shaft 23 by a selector fork (not shown) engaging a groove 47, supports a pin 48, the latter being endwise located by abutments 49, 50 in a hole of the selector. In the position shown, the pin 48 is engaged in aligned holes of the worm-wheel and the flanges 33 and 39 whereby the worm-wheel is clutched to drive both ground-engaging wheels. When the selector is slid rightwards to withdraw the pin from the hole in the flange 33 the right-hand wheel 11 only will be driven, leaving the left-hand one free (e. g., to facilitate steering); while when the selector is slid still further to the right the pin 38 is also withdrawn from the flange 39 so that both wheels 11 will be in neutral and allow the cultivator to be wheeled about freely.

Figure 4:
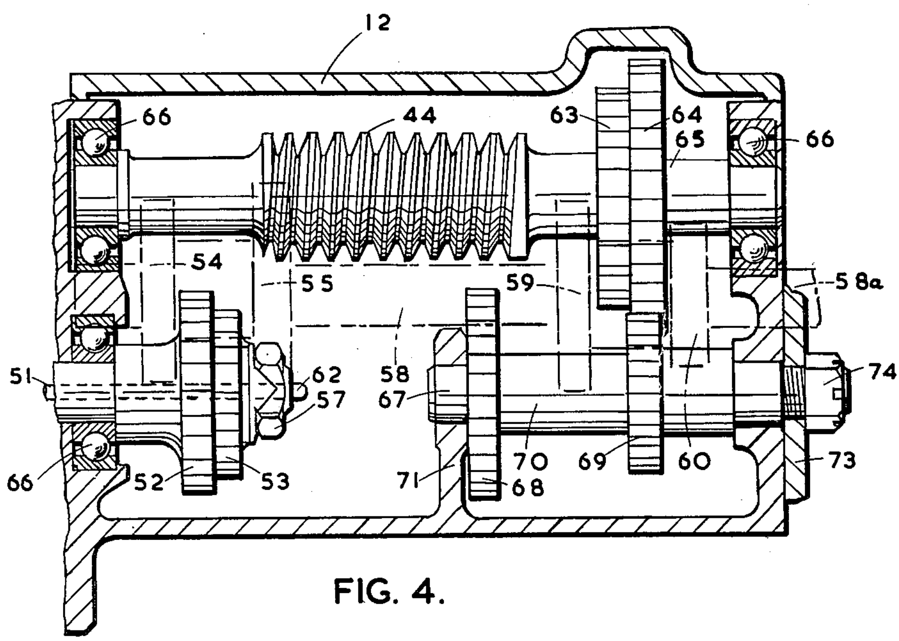
Figure 4 is a section on the line 4—4 of Figure 3 and drawn to the same scale as the latter.
Figure 3:
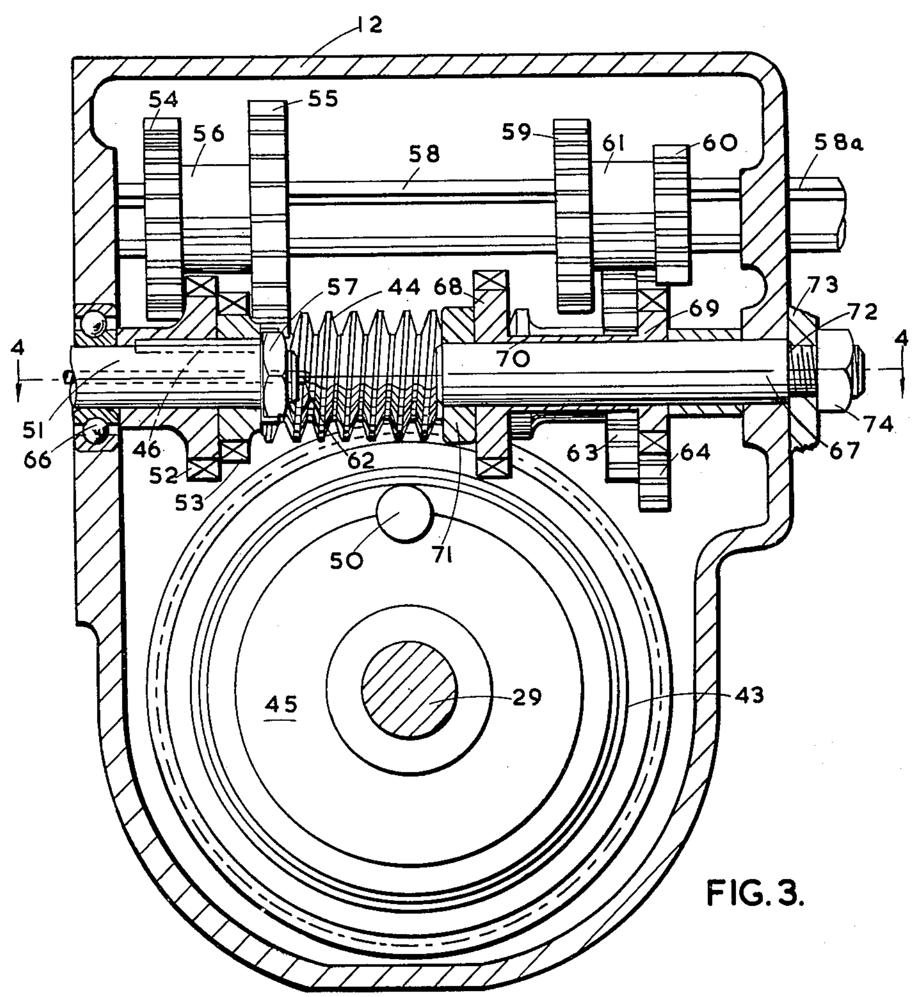
Figure 3 is a section, to a still larger scale, substantially on the line 3—3 of Figure 2.

Figures 2, 3 and 4 show the driving arrangements for the worm 44, and for a shaft which is to drive the rotor of the attachment 18. The engine-driven shaft is shown at 51, and it carries a pair of fixed, unequal gear wheels 52 and 53 which, with an intermediate neutral position, can respectively be meshed by coacting gear wheels 54, 55. The latter are fast with a sleeve 56 which is slidable, by a selector fork (not shown), on a parallel, splined shaft 58, and this shaft also slidably supports a pair of unequal gear wheels 59, 60 fast with a sleeve 61 which can be slid by another selector fork (not shown).

The wheels 59 and 60 can selectively mesh, with an intermediate neutral position, coacting gear wheels 63, 64 fast with the worm shaft 65. The shafts 51, 58 and 65 are supported from the casing 12 by ball bearings 66.

The shaft 58 extends rearwardly from the casing 12, as shown at 58*a*, for driving connection to an input shaft of the attachment 18, and it will be seen that this input shaft can be driven at two different speeds depending upon which of the gear pairs 52 and 54 or 53 and 55 is engaged. It will also be seen that the worm 44 can be driven at two different ratios from the shaft 58 (i. e., making four different worm speeds in all) according to which of the gear pairs 59 and 63 or 60 and 64 is engaged.

For providing a reverse drive for the wheels 11, casing 12 supports a lay shaft 67 on which is journalled a pair of gear wheels 68, 69 fast with a sleeve 70. The reverse drive is obtained by sliding the gear wheel 59 into mesh with gear wheel 68, and the worm 44 is then driven by the gear pair 69 and 64 which are in constant mesh. Figure 3 shows a support 71 for the inner end of the lay shaft 67, and that the latter is endwise located by a shoulder 72 being held up to an external boss 73 by a nut 74.

It will be seen from Figure 3 that the gear wheels 52 and 53 are held on the shaft 51 by a key 46 and a nut 57, and that the shaft 51 has a bore through which slidably extends a rod 62, operable by means (not shown) within the casing 12, for actuating a clutch (not shown) in the drive from the engine to the shaft 51.

Figure 5:
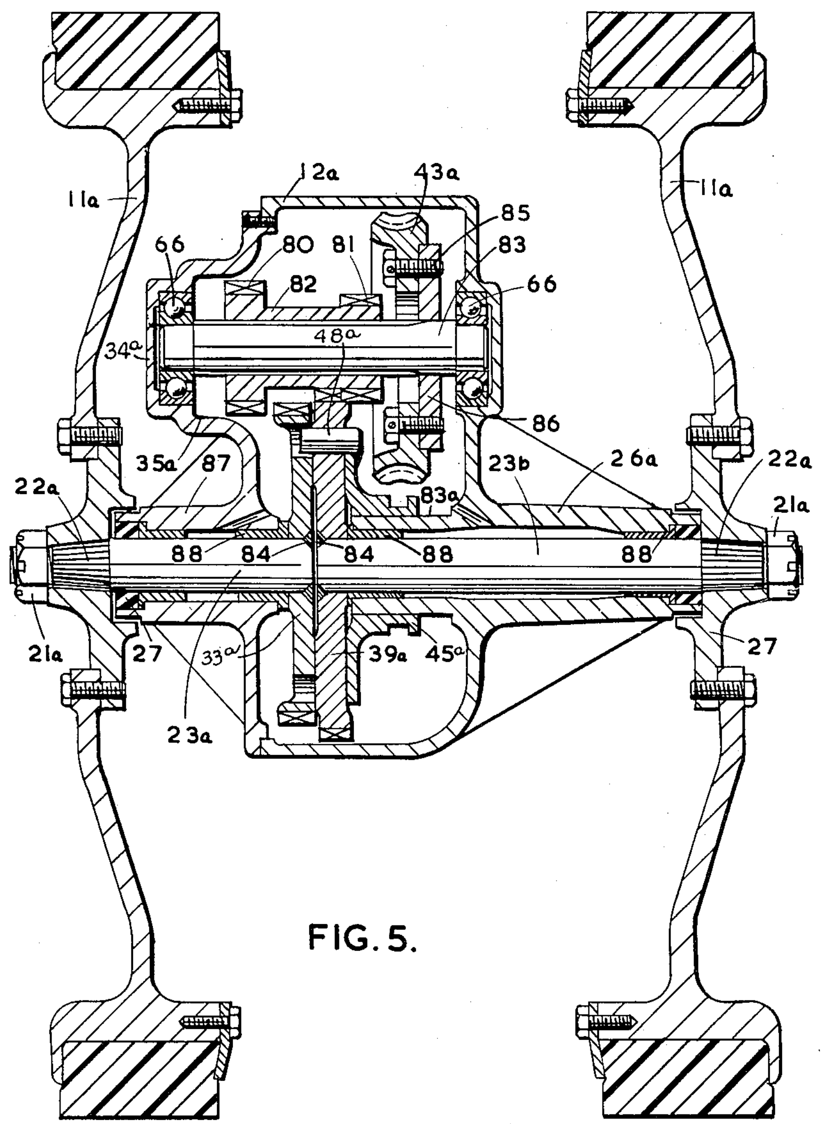
Figure 5 is a view which is similar to Figure 2 but illustrates a modified construction.

In the modification shown in Figure 5, in which the similar parts have similar reference numerals, the ground-engaging wheels 11*a*, 11*a* are held by nuts 21*a*, 21*a* on splined coned portions 22*a*, 22*a* of two, separate, aligned shafts 23*a*, 23*b*, these shafts respectively being journalled in the detachable cover 34*a* of the casing 12*a* and in the casing itself. The shafts 23*a* and 23*b* respectively carry discs 33*a* and 39*a*, which, in this instance, are of different diameters and provided with peripheral gear teeth adapted selectively to be meshed by a pair of coacting gear wheels 80 and 81 fast with a sleeve 82 which is slidably splined to a shaft 83 on which the worm-wheel 43*a* is fast. The discs 33*a* and 39*a* are arranged to be close to each other and are shown secured to their respective shafts by welding 84. A selector fork (not shown) slides the sleeve 82 for engaging the wheel 80 with the teeth of the disc 33*a*, or the wheel 81 with the teeth of the disc 39*a*, the spacing of the wheels 80 and 81 providing an intermediate neutral position.

The slidable selector 45*a* is journalled on an inward extension 83a, of the casing, and the pin 48a, in one extreme position of the selector, engages in the aligned holes of both discs 33a and 39a, whereby both wheels 11a are driven in unison at the speed ratio selected by the sliding of the sleeve 82; while in the opposite extreme position of the selector the pin 48a is withdrawn from the hole in the disc 33a, whereby to allow the associated wheel 11a to be disconnected from the drive and the other one to be driven.

As shown, the worm-wheel 43a has a central recess to accommodate the gear wheel 81 when the gear pair 80, 33a is engaged, and for this purpose the worm-wheel is in the form of a ring secured by a circle of screws 85 to a disc 86 which is made fast, as by welding, to the shaft 83. It will also be seen that the casing and its cover have respective outward tubular extensions 26a and 87 containing bearing liners 88 for the shafts 23a and 23b and that oil seals 27 are provided at the outer ends of these extensions.

Figure 1 also shows a member 89 of a frame which is fast at its front with the casing 12 or 12a and supports, at the rear, a pivot 90 for four control levers 100 working in a composite gate 101. As regards the construction of Figures 2 to 4, these control levers are connected by respective rods 102 to operate mechanisms (the external portion of one of which is shown at 103) for actuating a dog-clutch (not shown) between the input shaft of the attachment 18 and the extending end 58a of the shaft 58, and for actuating the selector 45 and the sleeves 56 and 61. Or as regards the construction of Figure 5 there could be three of the levers, one for operating the dog-clutch in the drive to the attachment 18 and two others respectively for operating the selector 45a and the sleeve 82. It is desirable for certain of these movable elements, particularly the selectors 45 and 45a, to be spring-biassed into their full engaging positions, and this can be effected by incorporating springs, like 104, in the mechanisms for operating them; or it may even be desirable for some of the movable elements (e. g., the selector 45a) to be spring-biassed to both extreme positions, and any known means could be used for the purpose.

What I claim as my invention and desire to secure by Letters Patent of the United States is:

1. A walk-type cultivating machine having a cultivating element, and a pair of ground-engaging wheels which are spaced along a transverse axis of the machine, including journal means for said ground-engaging wheels, respective flanges coaxially fast with said ground-engaging wheels, each of said flanges having an axially-directed hole adjacent its periphery, a gear wheel coaxial with said ground-engaging wheels, means driving said gear wheel, a pin slidable in an axially-directed hole in said gear wheel, said holes of said flanges and gear wheel being at the same radial distance from said axis, and means for reversibly sliding said pin from one extreme position in which it engages in said hole of said gear wheel and in said holes of both said flanges for establishing a drive to both said ground-engaging wheels, through an intermediate position in which it is withdrawn from the hole of the flange fast with one of said ground-engaging wheels for establishing a drive to the other said ground-engaging wheel only, to an opposite extreme position in which it is withdrawn from both said flange holes so as to disconnect said drive from both said ground-engaging wheels.

2. A walk-type cultivating machine having a cultivating element, and a pair of ground-engaging wheels which are spaced along a transverse axis of the machine, including journal means for said ground-engaging wheels, respective flanges coaxially fast with said ground-engaging wheels, each of said flanges having an axially-directed hole adjacent its periphery, a gear wheel coaxial with said ground-engaging wheels, means driving said gear wheel, said driving means including a power input shaft of said cultivating element, a parallel shaft on which said gear wheel is mounted, and change-speed gearing between said input and parallel shafts whereby said gear wheel can be driven at alternative ratios with respect to said input shaft, a pin slidable in an axially-directed hole in said gear wheel, said holes of said flanges and gear wheel being at the same radial distance from said axis, and means for reversibly sliding said pin from one extreme position in which it engages in said hole of said gear wheel and in said holes of both said flanges for establishing a drive to both said ground-engaging wheels, through an intermediate position in which it is withdrawn from the hole of the flange fast with one of said ground-engaging wheels for establishing a drive to the other said ground-engaging wheel only, to an opposite extreme position in which it is withdrawn from both said flange holes so as to disconnect said drive from both said ground-engaging wheels.

3. A walk-type cultivating machine having a cultivating element, and a pair of ground-engaging wheels which are spaced along a transverse axis of the machine, including journal means for said ground-engaging wheels, respective flanges coaxially fast with said ground-engaging wheel, each of said flanges having an axially-directed hole adjacent its periphery, a gear wheel coaxial with said ground-engaging wheels, means driving said gear wheel, said driving means including a power-driven shaft, a parallel power input shaft of said cultivating element, change-speed gearing between said power-driven and input shafts, whereby the latter can be driven at alternative ratios from said power-driven shaft, a second parallel shaft on which said gear wheel is mounted, and a change-speed gearing between said input and second parallel shafts whereby said gear wheel can be driven at alternative ratios with respect to said input shaft, a pin slidable in an axially-directed hole in said gear wheel, said holes of said flanges and gear wheel being at the same radial distance from said axis, and means for reversibly sliding said pin from one extreme position in which it engages in said hole of said gear wheel and in said holes of both said flanges for establishing a drive to both said ground-engaging wheels, through an intermediate position in which it is withdrawn from the hole of the flange fast with one of said ground-engaging wheels for establishing a drive to the other said ground-engaging wheel only, to an opposite extreme position in which it is withdrawn from both said flange holes so as to disconnect said drive from both said ground-engaging wheels.

4. A walk-type cultivating machine having a cultivating element, and a pair of ground-engaging wheels, including a pair of aligned transverse shafts, said ground-engaging wheels respectively fast with the ends of said aligned shafts which are remote from each other, journal means for said aligned shafts, a peripherally-toothed flange coaxially fast with the inner end of one of said aligned shafts, said flange having an axially-directed hole adjacent its periphery, a gear wheel coaxially fast with the inner end of said other aligned shaft, said gear wheel and flange of different diameters, a parallel driven shaft, a pair of relatively fast coaxial gears slidably splined on said driven shaft, the gears of said pair for selectively meshing the said gear wheel and peripherally-toothed flange respectively, a pin slidable in an axially-directed hole in said gear wheel, said holes of said flange and gear wheel being at the same radial distance from said axis, and means for sliding said pin between a position in which it engages in both said holes for establishing a drive to both said ground-engaging wheels and a position in which it is withdrawn from said flange hole so as to disconnect the drive to the ground-engaging wheel fast with said flange.

References Cited in the file of this patent

UNITED STATES PATENTS

| | | |
|---|---|---|
| 1,691,978 | Liedtke | Nov. 20, 1928 |
| 1,865,022 | Larson | June 28, 1932 |